United States Patent Office 3,068,061
Patented Dec. 11, 1962

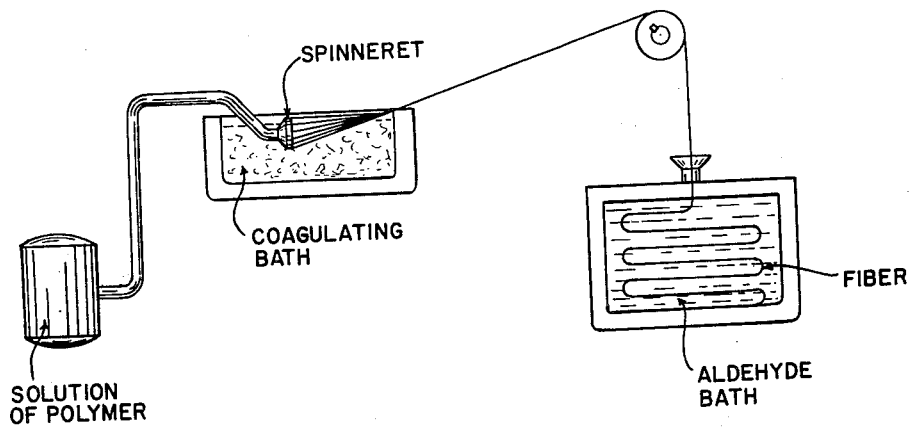

3,068,061
PHOSPHORYLATED POLYVINYL ALCOHOL PRODUCTS AND METHOD OF PRODUCING SAID PRODUCTS
John H. Johnson and Joseph E. Fields, Dayton, Ohio, assignors to Monsanto Chemical Company, St. Louis, Mo., a corporation of Delaware
Filed July 11, 1960, Ser. No. 41,763
11 Claims. (Cl. 18—54)

This invention relates to the formation of fibers, filaments, threads, tapes, cords, bristles and the like. More particularly it relates to the formation of fibers and films from phosphorylated polyvinyl alcohol. Specifically, the invention provides water-insoluble and flame-retardant fibers and films derived from phosphorylated polyvinyl alcohol.

The phosphorylated polyvinyl alcohol which we employ in the manufacture of fibers therefrom is well known to the art (see, e.g., Ferrel et al., J. Amer. Chem. Soc. 70, 2103-4 (1948)). It may be prepared by reaction of polyvinyl alcohol with a phosphorylating agent such as phosphorus pentoxide, phosphoric acid or phosphoryl chloride or with a monosalt of phosphoric acid such as urea phosphate or monoammonium phosphate. When phosphoryl chloride is used, the product will contain some chlorine, i.e., all of the chlorines of the phosphoryl chloride do not react, unless by cross-linking. However, the product is easily hydrolyzed to the free polyvinyl phosphoric acid. When urea phosphate is used, the product is a salt which is readily hydrolyzed either to the free polyvinyl phosphoric acid or to the monoammonium salt. When the monoammonium phosphate is used, the product is the monoammonium salt of polyvinyl phosphoric acid which, of course, can be hydrolyzed to the free acid. The extent of phosphorylation will depend upon the quantity of phosphorylating agent which is available and reaction time and temperature. For the present purposes it is desirable that at least 5% of the hydroxy radicals of the polyvinyl alcohol be phosphorylated. Generally, products in which from, say, 10% to 25% of said hydroxy groups have been phosphorylated are useful in the manufacture of the presently provided fibers and filaments though the extent of phosphorylation may be as high as, say, 90% of the hydroxy groups.

The phosphorylated units are depicted by the formula

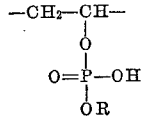

where R is selected from the class consisting of H and —NH$_4$. In addition to the above units, depending upon the extent of phosphorylation, there are present in the phosphorylated polyvinyl alcohol units containing the unreacted hydroxy group

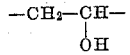

When commercial polyvinyl alcohol has been used for the manufacture of phosphorylated polyvinyl alcohol, there will probably also be present units containing the carboxylate radical of the polyvinyl ester from which the polyvinyl alcohol is derived. This is because the method by which it is usually prepared, i.e., by hydrolysis of a polyvinyl alkanoate, e.g., a formate, acetate, propionate or butyrate, generally gives a product which contains some unhydrolyzed ester groups. It will be readily understood that when the partially unhydrolyzed material contains a large proportion of unhydrolyzed carboxylate groups, the extent of phosphorylation is not so great as when the polyvinyl alkanoate is substantially completely hydrolyzed. The presently useful phosphorylated polyvinyl alcohols are those obtained from the polyvinyl alcohol in which the residual ester content is not more than 25%. Polyvinyl ester hydrolysis products containing not more than 25% of unhydrolyzed ester groups are herein referred to simply as polyvinyl alcohol. The degree of polymerization of the polyvinyl alcohol which is used to give the presently useful phosphorylated polyvinyl alcohol is from 8,000 to 20,000.

In prior art, phosphorylated polyvinyl alcohol has been of limited utility. As generally prepared, it is water-soluble, and hence useful only in applications where such solubility is permitted. Although, depending on the method of preparation and upon whether or not extensive heating is employed in its isolation, there can be obtained phosphorylated polyvinyl alcohols of decreased water-solubility, such materials lack uniformity with respect to both physical appearance and chemical properties, and have been of only academic interest.

Now we have found that water-soluble phosphorylated polyvinyl alcohol wherein from 5% to 90% of the hydroxy groups of the polyvinyl alcohol have been converted to the phosphorylated units hereinbefore depicted or to the monoammonium salt thereof, can be readily converted into highly desirable fibers and filaments by employing the following procedure: there is prepared a 5% to 25% aqueous solution of the phosphorylated polyvinyl alcohol or the ammonium salt thereof, and the solution is extruded through nozzles or slits into a coagulating bath which may be an organic, inert liquid in which the extruded polymer is insoluble, e.g., acetone, or an acidic, aqueous solution of an alkali sulfate, and which coagulating bath may or may not also contain an alkanecarboxaldehyde, e.g., formaldehyde, acetaldehyde, propionaldehyde, butyraldehyde, etc. In the absence of the aldehyde, the fiber or filament which is obtained is water-soluble. In the presence of the aldehyde, however, the extruded material is water-insoluble. The water-soluble product obtained by extrusion into the aldehyde-free bath can be rendered water-insoluble by subsequent treatment with the carboxaldehyde. The aldehyde treatment is advantageously effected in acidic media, e.g., a mineral acid may be present to give a pH of less than 7. Whether or not the initially employed polymer is the partially phosphorylated polyvinyl alcohol or the monoammonium salt thereof, the insolubilized fiber is an acetal of partially phosphorylated polyvinyl alcohol and a saturated aliphatic, unsubstituted carboxaldehyde of from 1 to 5 carbon atoms.

Accordingly, the invention provides either a one-step or a two-step method of manufacturing the water-insoluble filaments or fibers of partially phosphorylated polyvinyl alcohol. The two-step process is advantageously employed in the preparation of fibers to be used in the manufacture of textiles. This is because it permits drawing of the fibers for the purpose of increasing the crystallinity of the polymer and effecting orientation in the polymer chain. The two-step process also permits an intermediate heating step which is conductive to the manufacture of special purpose fibers and which heating step may be conducted simultaneously with the stretching operation.

The fibers or filaments which are obtained by either the one-step or two-step processes are clear and transparent, possess very good tensile strength, and are characterized not only by water-insolubility but also by possessing flame-retardant property. The presently provided filaments or fibers resemble considerably those obtained from other vinyl polymers with respect to utility and workability, but they are characterized by possessing a degree of flame-resistance which is lacking in the prior art materials.

In the problem of reducing the danger of fire in the use of various polymers in fields involving exposure to flames, it is obvious that the large proportion of carbon, hydrogen and oxygen which is present in most polymers makes them particularly susceptible to combustion. Although considerable effort has been expended at rendering the polymeric materials more resistant to combustion by external application of flame-proofing materials, these efforts have been not too productive because of the obvious difficulty of coating fibers or filaments with retentive materials. The presently provided fibers or filaments are rendered internally flame-retardant.

In accordance with the terminology which has developed in this field, "rendering flame-retardant" means the treating of a material so that it becomes resistant to the propagation of flame across its surface after the igniting flame has been removed; that is, a properly flame-retarded material will not support combustion independently of an external source of heat. In contact with an open flame, however, or at very high temperatures, flame-retardant organic materials can be expected to char and decompose.

The drawing shows a solution of the phosphorylated polyvinyl alcohol being extruded into a coagulating bath and the thereby obtained fibers being passed into an aldehyde containing bath.

The invention is further illustrated by, but not limited to, the following examples:

Example 1

A monoammonium salt of phosphorylated polyvinyl alcohol was prepared as follows from polyvinyl alcohol obtained by 86–89% hydrolysis of high viscosity polyvinyl acetate: a mixture consisting of 50 g. of the polyvinyl alcohol, 200 g. of urea, and 146 g. of 35% aqueous phosphoric acid was heated for 2 hours at 110° C. and then air-dried at 150° C. for about 15 minutes. The resulting mixture was dissolved in hot water and precipitated with acetone. Dissolving of the precipitate in water, re-precipitation from acetone and air drying of the precipitate gave the white, powdery monoammonium salt of phosphorylated polyvinyl alcohol, i.e., a product in which there was present a plurality of the units

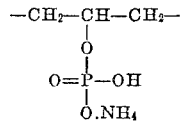

A 20% aqueous solution of the phosphorylated polyvinyl alcohol salt obtained above was extruded into a coagulating bath consisting of absolute ethanol to which there had been added a 3% concentration of formaldehyde in the form of a 37% aqueous solution. After being allowed to stand in the solution at room temperature for three hours, the fibers were collected and air-dried overnight. The fibers of formalized, partially phosphorylated polyvinyl alcohol thus obtained were water-insoluble. When a strand of the fibers was held in the flame of a Bunsen burner it ignited; but as soon as it was withdrawn from the flame, burning ceased and there was no afterglow.

Example 2

A 20% aqueous solution of the phosphorylated polyvinyl alcohol ammonium salt of Example 1 was extruded into a coagulant bath consisting of 350 g. of sodium sulfate, 110 g. of sulfuric acid, 10 g. of formaldehyde and 1 liter of water. The formaldehyde concentration of the bath was then raised to about 10% and the extruded fibers were allowed to remain in the bath overnight. After washing with water to remove any sulfuric acid and sodium sulfate, the washed fibers were air-dried. Testing for water-resistance and flame-retardancy of the formalized partially phosphorylated polyvinyl alcohol fibers thus obtained showed them to be substantially like the fibers obtained in Example 1.

Example 3

In this example the fibers were first extruded and then subsequently treated with formaldehyde.

A 20% aqueous solution of the phosphorylated polyvinyl alcohol ammonium salt of Example 1 was extruded into acetone and the fiber thus obtained was air-dried overnight. It was found to dissolve very rapidly (within about 10 seconds) in cold water. The water-soluble fibers were then immersed in an ethanol bath which had been heated to boiling and which contained about a 3% concentration of formaldehyde and about an 0.5% concentration of hydrochloric acid. After standing in the bath for two hours they were air-dried overnight. The fibers of the formalized, partially phosphorylated polyvinyl alcohol thus obtained were found to be flame-retardant and glowproof. They were not swollen by either cold or boiling hot water; for example, after being maintained in boiling water for one hour the fiber retained its original dimension.

Similar results were obtained by extruding the phosphorylated polyvinyl alcohol salt into ethanol rather than acetone.

Example 4

Phosphorylated polyvinyl alcohol is prepared from a polyvinyl alcohol supplied by Du Pont de Nemours and Company as "Elvanol 72–51," and containing not more than 1.5% of unhydrolyzed ester groups. The phosphorylation is effected by mixing the polyvinyl alcohol with phosphoric acid containing an excess of phosphorus pentoxide (ca. 77% $P_2O_5$) and allowing the resulting mixture to stand, with periodic stirring, for about three days. The product thus obtained is 60% phosphorylated polyvinyl alcohol, i.e., 60% of the —$CH_2CH(OH)$— of the polyvinyl alcohol have been converted to the unit

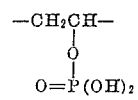

The phosphorylated polyvinyl alcohol prepared above is formed into the fibers by extruding a 15% aqueous solution thereof into acetone. The fibers thus obtained are air-dried, cold-drawn to several hundred percent and heated at about 200° C. for a few minutes. They are then immersed into a heated bath consisting of methanol, about a 5% concentration of acetaldehyde and about a 2% concentration of sulfuric acid for one hour. Upon washing with water and air-drying there are obtained flame-retardant fibers of acetalized, partially phosphorylated polyvinyl alcohol. They are unaffected by boiling water.

Example 5

A 25% aqueous solution of the phosphorylated polyvinyl alcohol of Example 4 is extruded into a film using an acetone bath as coagulant. After air-drying, the film is immersed into a heated (100° C.) bath of dioxane containing a 10% solution of butyraldehyde and a 5% concentration of phosphoric acid. After 30 minutes, the film is water-washed and air dried. It is found to be water-resistant and flame-retardant.

Example 6

A 20% aqueous solution of the phosphorylated polyvinyl alcohol of Example 1 is extruded into a ribbon using a coagulant bath consisting of an aqueous 10% sodium sulfate solution containing a 5% concentration of sulfuric acid and an 8% concentration of formaldehyde. The temperature of the bath is then raised to 80° C. and maintained at this temperature for one hour. After washing and air-drying a water-resistant, flame-retardant extruded ribbon of the formalized, partially phosphorylated polyvinyl alcohol is obtained.

What we claim is:

1. A shaped, continuous product comprising the acetal of partially phosphorylated polyvinyl alcohol and a saturated aliphatic, unsubstituted carboxaldehyde of from 1 to 5 carbon atoms, said article being substantially water-insoluble and flame-retardant.

2. The method of preparing water-insoluble, flame-retardant fibers which comprises extruding a solution of a polymer selected from the class consisting of phosphorylated polyvinyl alcohol and the monoammonium salt thereof into a coagulating bath comprising an inert liquid which is a non-solvent for the said polymer to obtain fibers of the polymer and subsequently treating said fibers with a saturated aliphatic, unsubstituted carboxaldehyde of from 1 to 5 carbon atoms.

3. The method of preparing water-insoluble, flame-retardant fibers which comprises extruding a solution of partially phosphorylated polyvinyl alcohol into a coagulating bath comprising a non-solvent for the polymer to obtain fibers of the polymer and treating said fibers with a saturated aliphatic, unsubstituted carboxaldehyde of from 1 to 5 carbon atoms.

4. The method of preparing water-insoluble, flame-retardant fibers which comprises extruding a solution of the monoammonium salt of phosporylated polyvinyl alcohol into a coagulating bath comprising a non-solvent for the polymer to obtain fibers and treating said fibers with a saturated aliphatic, unsubtituted carboxaldehyde of from 1 to 5 carbon atoms.

5. The method of preparing water-insoluble, flame-retardant fibers which comprises extruding an aqueous solution of a partially phosphorylated polyvinyl alcohol into a coagulating bath comprising a non-solvent for the polymer to obtain fibers of the polymer and treating said fibers with formaldehyde.

6. The method of preparing water-insoluble, flame-retardant fibers which comprises extruding an aqueous solution of the monoammonium salt of partially phosphorylated polyvinyl alcohol into a coagulating bath comprising a non-solvent for the polymer to obtain fibers and treating said fibers with formaldehyde.

7. The method of preparing a water-insoluble, flame-retardant fiber which comprises extruding a solution of a polymer selected from the class consisting of partially phosphorylated polyvinyl alcohol and the monoammonium salt thereof into a coagulating bath comprising a non-solvent for the polymer and a saturated aliphatic, unsubtituted carboxaldehyde of from 1 to 5 carbon atoms.

8. The method of preparing a water-insoluble, flame-retardant fiber which comprises extruding an aqueous solution of partially phosphorylated polyvinyl alcohol into a coagulating bath comprising formaldehyde and a non-solvent for the polymer.

9. The method of preparing a water-insoluble, flame-retardant fiber which comprises extruding an aqueous solution of the monoammonium salt of phosphorylated polyvinyl alcohol into a coagulating bath comprising formaldehyde and a non-solvent for the polymer.

10. A fibrous product comprising the acetal of partially phosphorylated polyvinyl alcohol, said product being substantially water-insoluble and flame-retardant.

11. A fibrous product comprising the formal of partially phosphorylated polyvinyl alcohol, said product being substantially water-insoluble and flame-retardant.

References Cited in the file of this patent

UNITED STATES PATENTS

| 2,407,061 | Dahle | Sept. 3, 1946 |
| 2,609,360 | Daul et al. | Sept. 2, 1952 |

FOREIGN PATENTS

| 774,818 | Great Britain | May 15, 1957 |

OTHER REFERENCES

Review of Textile Progress, 1954, pages 432–436, published in England.